United States Patent [19]

Kuris

[11] 4,222,868

[45] * Sep. 16, 1980

[54] ULTRASONIC OIL SPILL REMOVAL

[76] Inventor: Arthur Kuris, 3725 Henry Hudson Pkwy., Riverdale, N.Y. 10463

[*] Notice: The portion of the term of this patent subsequent to Nov. 21, 1995, has been disclaimed.

[21] Appl. No.: 958,651

[22] Filed: Nov. 8, 1978

Related U.S. Application Data

[63] Continuation-in-part of Ser. No. 748,187, Dec. 7, 1976, Pat. No. 4,126,547.

[51] Int. Cl.³ .............................................. C02F 1/36
[52] U.S. Cl. .................................... 210/748; 210/738; 210/923

[58] Field of Search ...................... 210/19, 65, 97, 104, 210/122, 152, 242, DIG. 22, DIG. 25, DIG. 26; 310/337; 366/127

[56] References Cited

U.S. PATENT DOCUMENTS

| | | | |
|---|---|---|---|
| 3,700,937 | 10/1972 | Rissolo | 310/337 |
| 4,032,438 | 6/1977 | Koblanski | 210/DIG. 22 |
| 4,126,547 | 11/1978 | Kuris | 210/DIG. 26 |

*Primary Examiner*—Ivars C. Cintins
*Attorney, Agent, or Firm*—Leonard W. Suroff

[57] ABSTRACT

Oil slicks on surface waters are dispersed by the exposure of the surface oils to ultrasonic energy to effectuate an homogenization of the oil and water to permit absorbtion of the oil within the total volume of water.

17 Claims, 2 Drawing Figures

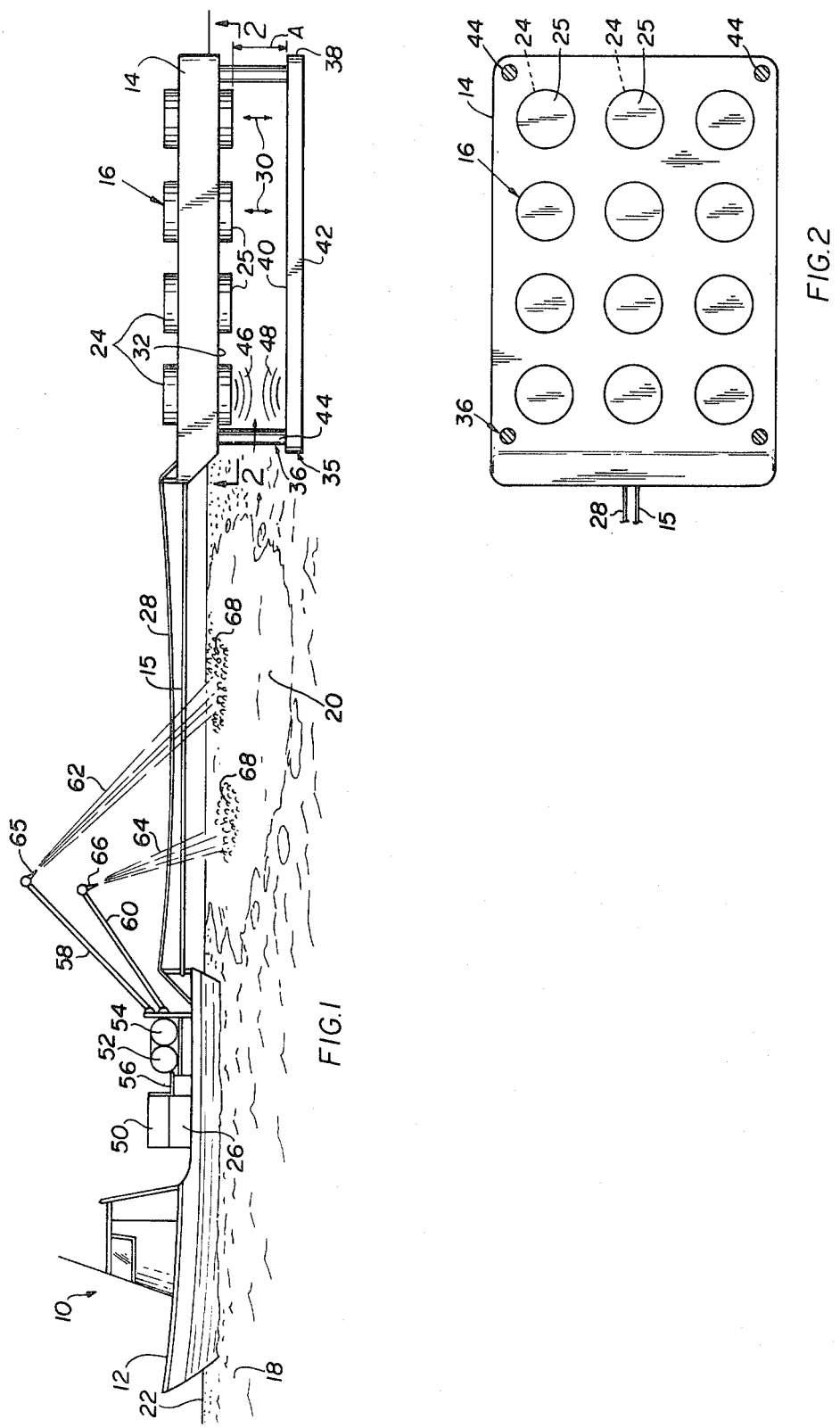

ULTRASONIC OIL SPILL REMOVAL

RELATED APPLICATION

This application is a continuation-in-part of Ser. No. 748,187 filed Dec. 7, 1976, and issued as U.S. Pat. No. 4,126,547 on Nov. 21, 1977, and all the subject matter of the above referenced patent is incorporated herein by reference.

BACKGROUND OF THE INVENTION

1. Field Of The Invention

The present invention relates to the removal of oil pollution from surface waters and more particularly the invention relates to the method and equipment for the clean-up of oil slicks on surface waters.

2. Description Of The Prior Art

The frequency and danger of oil spills has greatly increased in the past several years due to the use of super-tankers and the off-shore drilling in geologically active areas. Oil spill disasters have been experienced in the last several years due to these activities.

The techniques available for controlling and removing the slick from surface waters are unsatisfactory. Dispersants and detergents are effective in eliminating much of the slick but are feared because of the unknown effect on the ecological balance. Various absorbent materials have been proposed to be applied to the slick to sink the oil to the bottom of the ocean. Again, this may drastically upset the ecological balance.

Another technique utilizes a treated silica which will act as a wick and permit burning of the slick. This is not effective in many circumstances and is dangerous, especially in the presence of a natural gas leak. For these reasons, the slicks have been mainly controlled by very primitive methods such as by skimming with pumps and by coagulating the oil with straw which is then removed and burned.

The containment, removal, and cleanup of spilled oil are among the most difficult and most misunderstood problems in ocean engineering. The present difficulties are both technological (because physical and chemical understanding of some of the phenomena is incomplete) and sociological (because many untrained people wrongly believe that the problem is simple enough to be solved in short order with present-day technology). Except in a few highly specialized areas—offshore oil well drilling among them—business and government have devoted far less capital expenditure to ocean engineering than to other fields in the sense that many potential areas for technological development have not been pursued to the extend possible. The containment, removal, and cleanup of spilled oil is one such area. The application of modern technology to this problem did not begin on any large scale until the aftermath of the Torrey Canyon disaster in 1967.

There are many reasons why oil spill cleanup problems are so difficult. There is a lack of understanding of the physics and chemistry underlying some of the pollution control difficulties. Some oil slicks cover tens of square miles. Currents and waves generate enormous forces on equipment. The logistics of dealing with something so large and so mobile in the face of the large forces of the sea are staggering. The area of the earth susceptible to an oil spill is large, and spills occur at random.

A number of materials have been used to remove or reduce oil slicks. Treating agents have been used to deal with accidents and field and laboratory experiments have been done to assess their usefulness and to develop the technology to use them. The types of agents which have been used to date are:

1. Dispersants—chemicals forming oil-in-water suspensions;
2. Sinking agents—materials that mix with the oil and create a mixture dense enough to sink;
3. Burning agents—material put on the slick to assist ignition or enhance combustion of spilled oil;
4. Biodegradants—substances that promote oxidation of oil by microbial action;
5. Gelling agents—chemicals that form semi-solid oil agglomerates to facilitate removal;
6. Herding agents—chemicals that concentrate the spilled oil in a small area;
7. Sorbents—materials that absorb or adsorb oil to form a floating mass for later collection and removal.

Dispersants are chemical compounds that act to enhance the surface spreading of oil slicks and to emulsify the oil into the water beneath it. These effects increase the surface area of the slick so that more of it is susceptible to biodegradation. When emulsification (breaking the oil into very small droplets that become mixed with the water) occurs, the slick disperses vertically as well as horizontally. Toxicity of dispersed slicks is a major problem and is due both to the effect of the dispersant and to the increased oil surface to which marine organisms are exposed.

The use of chemical dispersants presents two major problems. The first is to obtain adequate mixing between the dispersant and the oil slick; and the second is to minimize toxicity to marine life. The mixing difficulty was demonstrated in the Santa Barbara accident, where it was found that after the dispersant was spread in a fine mist over the oil slick, it was necessary to run work boats through the slick so that their propeller action would mix the dispersant with the oil. Work is currently underway on the development of dispersants that will require little or no mixing. However, the question of toxicity remains. Some dispersants are more toxic to marine life than others, and the differences may relate in part to varying quantities of oil surface to which organisms are exposed. As oil slicks are dispersed into droplets, the surface area multiples.

A less serious problem with dispersants involves the stability of the oil-water emulsion they generate. Experiments have shown that with some dispersants the lifetime of this emulsion can be relatively short, and the dispersed oil soon recombines into a slick. However, the stability of the emulsion generated by other dispersants is quite long, and a number of companies are doing work on increasing the emulsion stability.

Dispersants have been found effective when it is advantageous to disperse small parts of an oil slick. For example, dispersants were used and found effective to remove slicks in the vicinity of the burning oil platform at the Chevron Oil spill. However, it would have been impossible, even is allowed by law, to completely disperse all the polluting oil from this incident. If dispersants requiring no mixing are developed in the future, it may become possible to disperse an entire slick of moderate size.

Certain examples of the prior art are set forth in the U.S. Pat. Nos. 3,625,857 and 4,032,438.

OBJECTS OF THE INVENTION

An object of the present invention is to provide an improved method for removal of oil slicks under a variety of environmental conditions.

Another object of the present invention is to provide an improved method for absorbing the oil slick in the surrounding body of water.

Another object of the present invention is to employ a system which includes means for generating ultrasonic mechanical vibrations capable of lowering the viscosity of particles that are absorbed in the surrounding body of water.

Other objects of the present invention will become apparent as the disclosure proceeds.

SUMMARY OF THE INVENTION

Oil slicks are dispersed according to the invention by applying ultrasonic energy in a manner to produce periodic perturbations of large displacement amplitude in the fluid medium. The ultrasonic energy is applied to reduce the viscosity of the oil to the point of ready absorption of the oil into the large body of water associated therewith.

Generally speaking in accordance with the invention, a device for viscosity reduction of the oil into the body of water is obtained using an output radiator or ultrasonic motor for generating longitudinal vibrations of large displacement amplitude adapted to produce periodic perturbations in the oil. Reflecting means disposable in facing relation to the generating means output radiator may also be used. The oil to be dispersed is funneled through the gap between the ultrasonic motor and reflecting means for reflecting the vibrations back into the fluid medium consisting of the oil layer and water. The reflecting surface is spaced from the generating means output surface a distance such that the reflected vibrations are substantially in phase with the vibrations radiated into the fluid medium by the output radiator. In this manner, the displacement amplitude of the fluid medium perturbations are increased for the release of said oil particles into the fluid primarily by the selective entrainment characteristics of the forces generated by the perturbating medium to reduce the viscosity of the oil.

A method for cleaning the oil slick is provided wherein the oil slick is carried through a fluid medium with longitudinal vibrations of large displacement amplitude being applied to the fluid medium from one side of the oil slick to reduce the viscosity thereof.

The vibrations may be reflected at or somewhat beyond the other side of the oil slick back into the fluid medium with the reflected vibrations being substantially in phase with the applied longitudinal vibrations thereby substantially increasing the displacement amplitude of the fluid medium perturbations, the frequency of the vibrations and the viscosity of the fluid being coordinately selected for the release of particles from the oil slick into the body of water primarily by the selective entrainment characteristics of the forces generated by the perturbating medium.

The generating means may include ultrasonic transducer means for the vibration of the generating means output radiator in a longitudinal torsional, elliptical, and radial direction along an axis extending between the output radiator and the reflecting means. The fluid medium may include a chemical solvent said generating means being disposed so that the output radiator thereof lies in said fluid medium.

Where the fluid medium includes the oil slick, the generating means output radiator and reflector may be disposed in a liquid bath with the oil slick being carried therebetween; or means may be provided for depositing a layer of oil in advance of its passing between the generating and reflecting means so that the output radiator, liquid, and reflector are contiguous. In this manner the deposited oil slick becomes viscous and is absorbed in the body of water. Accordingly there is an homogenizing of the oil and water at the interface therebetween so as to reduce the resulting mixtures viscosity for absorbtion into the body of water. By continuing the application of the vibratory energy the identity of the oil slick can be sufficiently lost so that it is totally dispersed into the body of water. This can occur since the mass of the body of water is so much larger than the mass of the oil slick. In this manner one can reach the levels wherein the possible damages from the oil slick are greatly reduced or totally inhibited.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a schematic view of a system in accordance with the invention for removing oil spills; and FIG. 2 is a partial top view of a portion of the system illustrated in FIG. 1, taken along lines 2—2 of FIG. 1.

DESCRIPTION OF THE PREFERRED EMBODIMENT

Referring now to FIG. 1 an oil slick control system 10 which generally includes a vehicle such as a ship 12 and may include a second vessel 14 which is illustrated in tow by connecting means 15 extending therebetween. The second vessel 14 which may be in the form of a barge contains the ultrasonic means 16 for generating mechanical vibrations for transmission in the body of water 18 having the oil slick 20 contained on the surface 22 of the water 18. The ultrasonic means 16 for creating the elastic waves of a compressional nature are produced by one or more motors or transducers 24 having an exposed output end or radiator surface 25, which are energized by at least one oscillation generator means 26 with a power cable 28 connecting the two together. The oscillation generator means 26 shown schematically may be located on the ship 12 or the vessel 14.

The method and apparatus of the invention is obtained by providing a system adapted to be vibrated at an ultrasonic rate, with the term "ultrasonic" defined to include vibrations in the range of 1,000 to 1,000,000 cycles per second.

In accordance with the present invention, the oil deposits 20 are dispersed from the surface 22 by applying thereto high frequency mechanical vibrations. The effect of such vibrations is to dissolve the oil deposits 20 by reducing the viscosity thereof until the oil 20 is absorbed in the body of water 18. The vibrations necessary to achieve the foregoing have a high frequency within the range between 1,000 and 1,000,000 cycles per second, and preferably of at least 10,000 cycles per second, and an amplitude within the range of 0.0001 inch so as to provide high peak accelerations, preferably of the order of at least 1,000 g. Peak acceleration is equal to $4\pi^2 A/t^2$ in which A is the amplitude and t is 1/frequency. Thus, for example, with a frequency of 20,000 cycles per second and an amplitude of 0.002 inch, a peak acceleration of approximately 100,000 g is obtained. With "g" being the symbol representing gravitational acceleration.

The power energy level for driving all the motors 24 is generally in the order of from 1,000 to 100,000 watts depending on the size of the motors, etc. The generator means 26 may also be of the type having a built in frequency modulator which continuously varies the frequency over a preselected frequency range. Electrical generator 26 is adapted to produce a signal of predetermined frequency which is applied along leads in power cable 28 as the excitation for said transducer. The excitation may either have a conventional sinusodial waveform or may have other waveform configurations such as sawtooth or squarewave.

Accordingly there is an homogenizing of the oil 20 and water 18 at the surface of interface 22 therebetween so as to reduce the resulting mixtures viscosity for absorbtion into the body of water 18. By continuing the application of the vibratory energy the identity of the oil slick 20 can be sufficiently lost so that it is totally dispersed into the body of water 18. This can occur since the mass of the body of water 18 is so much larger than the mass of the oil slick 20. In this manner one can reach the levels wherein the possible damages from the oil slick are greatly reduced or totally inhibited.

The ultrasonic motor 24 may be one of a variety of electromechanical types, such as electrodynamic, piezoelectric and magnetostrictive, with the use of output sections that are readily replaceable when cavitational erosion of the output surface 25 occurs. A transducer as shown in FIG. 2 is utilized to initiate the generation of the high frequency field. The transducer is of the electro-acoustic type adapted to convert electrical energy into mechanical vibrations, a type frequently referred to in the art as ultrasonic transducers. While in the configuration of FIG. 2 a magnetostrictive transducer 24 is shown by way of example, like fields can also be produced by other electro-acoustic transducers such as electrostrictive and piezoelectric transducers which are equally applicable to the arrangement according to the invention. All of these transducers have in common the ability to produce longitudinal vibrations of a fixed preselected fundamental frequency.

The ultrasonic motor 24 is longitudinally dimensioned so as to have lengths which are whole multiples of half-wave lengths of the compressional waves established therein so that longitudinal loops of motion as indicated by arrow 30, occur at the output end 25 of the motor 24. In the embodiment of FIG. 2 transducer 24 may be of any desired design capable of achieving the functions of transmitting the vibrations generated to output radiator 25 amplifying said vibrations and efficiently coupling them to the liquid medium. The components of the motor 24 are essentially plain homogeneous metal bodies whose characteristics as vibration amplifiers are defined by the geometry of their design, the magnification produced being a function of their input and output surface areas, and their geometric profile along the vibration propagation axis. The axis is perpendicular to the plane of the surface defining output radiator 25. Along the axis, the coupling elements are each mechanically resonant at the fundamental vibration frequency of the transducer 24.

Multiple stage amplification can be utilized if desired to increase the potential gain of the device. However, each successive stage added to the device markedly reduces its transmission efficiency. Dissipation of the vibrational energy into the surrounding structure such as an inner housing, is avoided by mounting means of an isolator type known in the art, or at a vibration nodal plane, in a conventional manner.

The surface defining output radiator 25 is plane and perpendicular to the vibration propogation axis. The shape thereof can take any number of geometric forms; however, in the embodiment shown in the drawings, a plane circular output surface is shown. Accordingly, the output end 25 of each motor 24 may be circular in configuration of a few inches to in excess of one foot in diameter or some other shape. The number of motors illustrated is merely to indicate the positionment relative to the vessel 14 and the fact that the output end 25 may be below the oil slick 20, slightly above the oil slick 20 to form a cavity, or substantially level with the water slick 20. In similar fashion the bottom 32 of the vessel 14, may extend above, level, or below the water surface 22. In relation to the output surfaces 25 the bottom 32 may extend in a plane above, below or level therewith.

Further, the relationship may vary in progression from either end of the vessel relative to the reflecting means 35 mounted in fixed spaced relation by mounting means 36 to the vessel 14. As seen in FIG. 1 the plate 38 forming the reflecting means 35 may have an upper planar surface 40 and spaced apart lower surface 42 mounted in substantially parallel spaced relation to the bottom 32 of vessel 14 by posts 44 forming the mounting means 36. The number of posts 44 will vary in accordance with size or area being supported. The thickness of the plate 36 may vary from below one inch to several inches and may by made of sections.

It is also appreciated that a single vessel, which may be the boat 12, may have the transducers 24 mounted thereon in energy transferring relation to the oil slick 20 with the reflecting means 35 mounted therebelow. The advantage of a separate vessel 14 containing the ultrasonic equipment 16 is that more than one vessel 14 may be towed at one time to cover a large surface area. The spacing defined by dimension A between the reflecting means 35 and the radiator surface 25 may vary in distance from one quarter of an inch to one foot and may be in multiples of the length of a standing wave generated by the motors 24 in the body of water 18. The elastic energy waves 46 eminate from the radiator surface 25 and through the elastic medium comprised of the oil 20 and water 18 and is then reflected from the surface 40 in the form of returning energy waves 48.

Reflector 35 is adapted to reflect the high frequency field emanating from output radiator 25 back into the fluid medium. By properly positioning the principal surface 38 of reflector 35 relative to output radiator 25 reflector 35 serves to magnify the amplitude of the periodic perturbations of the fluid medium. Principal surface 38 of reflector 35 is a smooth flat plane surface oriented substantially perpendicular to the vibration propagation axis and parallel to output radiator 25. The reflector is positioned so that the primary beam of vibrational energy radiated from output radiator 25, or the output radiator of any other embodiment of the high frequency field generating device according to the invention, impinges on the principal reflecting surface thereof.

The surface area of principal surface 38 should preferably be large enough to intercept all of this energy. In order to achieve magnification of the periodic perturbations with the liquid medium, reflector 35 is designed and positioned such that the wavefronts reflected from the principal surface 38 of the reflector constitute a secondary source of vibrations which interfere with and have displacement amplitudes that are essentially in phase with the vibrations emanating from output radiator 25. Reinforcement of the vibrations in the fluid medium is developed by this in-phase superpostion of the principal and reflected vibration wavefronts, thereby increasing the displacement amplitude of the fluid perturbations. The reflector according to the invention produces amplification of the medium perturbations without requiring any additional energy to be supplied to the system from an outside source.

This amplification is dependent solely on specific mechanical properties of the reflector and its spatial orientation in the system. Preferably a plate of uniform thickness having a smooth flat principal surface 38 oriented substantially perpendicular to the vibration propagation axis, reflector 35 is located with the fluid medium interposed between its principal reflecting surface 38 and the output radiator 25 of the generating device 24. Two requisites exist in order to generate a field in a fluid medium wherein the incident and reflected vibration displacements are essentially in phase. Firstly, the phase of the vibrations normally incident to the reflector must undergo phase inversion at the fluid-reflector interface when reflected from said reflector principal surface. This phase inversion is produced where the material of said reflector has a characteristic impedance larger than the characteristic impedance of the fluid medium.

The phase inversion in conjunction with the second requisite permits the production of stationary waves or a high standing wave ratio in the fluid 18. The second requisite is the spacing between the reflector surface 38 and output radiator 25. In order to produce the stationary or high standing wave ratio field, such spacing must be approximately equal to n multiple half wave lengths of the vibration in the fluid where n is zero or any integer. For the narrow gap condition (zero half wave lengths plus a small increment), the relative position of the oil slick 20 contained between the reflector and output radiator is not critical, as where the spacing is less than one twentieth of a wave length. However, where n is an integer, the oil slick 20 should be situated in the region of a vibration displacement antinode for maximum process efficacy.

Two other factors influence the efficiency of reflector 35. The first of these is the magnitude of the mismatch between the characteristic impedance of the fluid 18 and the reflector. Increasing this mismatch increases the magnitude of the fluid perturbations by maximizing the percentage of the vibrational energy reflected back into the fluid medium 18. The second factor is the thickness of the reflector 35 in the direction parallel to the vibration propagation axis. For optimum reflection of the normally incident vibrations, this dimension should be equal to an integral number of odd quarter wave lengths of the fundamental vibration in the reflector. Reflector 35 is preferably formed from metal, tungsten being particularly adapted for this purpose.

The use of reflector 35 in conjunction with the vibration generating means 24 produces displacement amplitudes in the fluid medium 18 that could not otherwise be realized by the generating means alone. However, to insure proper operation of the system, the fluid medium should extend between, and be in contact with output radiator 25 and surface 38 of reflector 35. Where the fluid medium is liquid, a thin air or vapor film in the treatment zone between the reflector 35 and output radiator 25 of only a few thousandths of an inch in depth can effectively decouple the system and prevent the operation thereof. In the embodiment of FIG. 1, the oil slick 18 may be impregnated with a chemical before reaching the device according to the invention to enhance the reduction of viscosity of the oil layer or slick 20.

The foregoing arrangement serves to generate in the fluid medium 18 perturbations of large displacement amplitude which serve to develop disjunctive forces to reduce the viscosity of the oil 20. It has been found that the disjunctive forces are generated due to proper use of the selective entrainment characteristics exhibited by particles in a periodically perturbating fluid medium to reduce the viscosity thereof the forces are developed by application of the method according to the invention described herein.

These forces are produced and sustained by impressing high frequency vibrations on the fluid medium 18. The propagation of vibrations through the medium, of necessity, produces periodic perturbations of the fluid. The forces generated are due to the relative motion that occurs within the oil 20, thereby causing the oil 20 to have its viscosity reduced.

The forces developed on the oil 20 are periodic. However, at any given moment they are not uniformly distributed nor do they have the same magnitude. The oil particles are all individually subjected to the high frequency mechanical forces. The amplitude of these forces can vary widely and is a function of the kinematic constraints to which the oscillating oil particles are subject.

The viscosity reduction of the oil 20 may be enhanced by introducing one or more chemical agents to act upon the oil 20 to decrease its viscosity, or alter its characteristics in some manner to aid in the process. The homogenized solution after treatment by the ultrasonic means is dispersed a distance below the surface 22 and absorbed into the body of water 18. To introduce the chemical agents, the equipment for spraying may be located on ship 12. The equipment includes a compressor 50 which applies spraying pressure to barrels 52, 54 through hoses 56.

Output hoses 58, 60 deliver separate streams 62, 64 of liquid through nozzles 65, 66 onto the oil slick 20. The streams 62, 64 combine with the oil slick 20 and form particles 68. The liquid components may be sprayed from separate ships or from one or more airplanes or helicopters. Aircraft can apply the liquid in a shorter period but cannot carry as large a reservoir as a ship. The choice of craft for carrying the spray equipment will depend on the extent of the slick and the facilities available for fueling and reloading the liquid.

The particles 68 are then processed in the treatment zone and thereafter the highly viscous fluid exits into the body of water 18 and is absorbed therein. The invention is compatible with a wide variety of petroleum products either light or heavy viscosity and of aliphatic, aromatic, or nathenic character, such as fuel oil, parraffin oil, mineral oil, jetfuel, diesel fuel including marine, truck, and railroad diesels, heating fuels, and crude oils. The chemical agents in barrels 52 and 54 may be a treatment fluid for enhancing the viscosity reduction of the oil particles to form a suspension. The treatment fluid may be water, reactive agent, etc.

Accordingly by the present invention there is an homogenizing of the oil and water at the interface therebetween so as to reduce the resulting mixtures viscosity for absorbtion into the body of water. By continuing the application of the vibratory energy the identity of the oil slick can be sufficiently lost so that it is totally dispersed into the body of water. This can occur since the mass of the body of water is so much larger than the mass of the oil slick. In this manner one can reach the levels wherein the possible damages from the oil slick are greatly reduced or totally inhibited.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:

1. A method of removing an oil slick layer of material from a water surface comprising the steps of:
   A. vibrating a member having an output surface above the threshold range of the oil, in a frequency range of 1,000 to 100,000 cycles per second, so as to provide peak accelerations of at least 50,000 g.
   B. transmitting the vibratory energy from said output surface of said vibrating member to the water surface so as to transmit said vibrations to the oil and the water at the interface thereof,
   C. homogenizing the oil and the water at the interface thereof so as to reduce the resulting mixtures viscosity whereby ready absorption into the body of water is obtained and the oil slick is removed,
   D. engaging said vibrating member with the water surface adjacent to the interface so as to obtain said transmitting of the vibratory energy, and
   E. continuing the application of said vibratory energy until the identity of the oil slick is sufficiently lost so that it totally disperses into the body of water since the mass of water is so much larger than the mass of the oil slick such that one can reach the levels wherein the possible damages from the oil slick are greatly reduced or totally inhibited.

2. A method as defined in claim 1, further including the step of controlling the depth of immersion of said member in the body of water relative to the oil and water interface.

3. A method as defined in claim 1, wherein said output surface of said member is longitudinally vibrated.

4. A method as defined in claim 1, wherein said output surface of said member is torsionally vibrated.

5. A method as defined in claim 1, wherein said output surface is vibrated in the range of at least 100,000 to 150,000 g.

6. A method of removing an oil slick layer of material from a water surface comprising the steps of:
   A. vibrating a member having an output surface above the threshold range of the oil, so as to provide peak accelerations of at least 50,000 g,
   B. transmitting the vibratory energy from said output surface of said vibrating member to the water surface so as to transmit said vibrations to the oil and the water at the interface thereof,
   C. homogenizing the oil and the water at the interface thereof so as to reduce the resulting mixtures viscosity whereby ready absorbtion into the body of water is obtained and the oil slick is removed,
   D. disposing a reflecting surface beneath the oil slick,
   E. producing periodic perturbations in the oil slick by applying to the body of water vibrations of essentially plane wavefronts from the output surface propagated along an axis substantially normal to said reflecting surface, and
   F. reflecting said vibrations back into the body of water along an axis substantially normal to said reflecting surface so that said reflecting vibrations are substantially in phase with said applied vibrations to increase the displacement amplitude of the output surface perturbations such that disjunctive forces are produced for reducing the viscosity of the oil slick for absorption into the water at least in part due to the forces generated in said perturbating medium.

7. A method as defined in claim 6, and further including the step of selecting the frequency of said vibrations dependent upon the density of the oil.

8. A method as defined in claim 6, wherein said longitudinal vibrations applied to said oil slick are of an intensity to produce essentially non-linear perturbations, thereby generating ponderomotive forces within said oil slick for the reduction of viscosity of said oil particles into the water.

9. A method as defined in claim 6, including continuously advancing said reflecting surface and said source of vibrations to expose different portions of the oil slick.

10. A method as defined in claim 6, wherein said vibrations are applied to said reflecting surface substantially in phase with said applied vibrations to increase the displacement amplitude of the oil slick perturbations.

11. A method of removing an oil slick layer of material from a water surface comprising the steps of:
    A. vibrating a member having an output surface above the threshold range of the oil in a frequency range of 1,000 to 100,000 cycles per second, so as to provide peak accelerations of at least 50,000 g.
    B. engaging said output surface of said vibrating member with the water surface to transmit said vibrations to the oil and the water at the interface thereof,
    C. homogenizing the oil and the water at the interface thereof so as to reduce the resulting mixtures viscosity whereby ready absorbtion into the body of water is obtained and the oil slick is removed,
    D. progressively moving said output surface relative to the oil slick layer, whereby the homogenized particles of oil are absorbed into the body of water and the oil slick is removed,
    E. continuing the application of said vibratory energy until the identity of the oil slick is sufficiently lost so that it totally disperses into the body of water since the mass of water is so much larger than the mass of the oil slick such that one can reach the levels wherein the possible damages from the oil slick are greatly reduced or totally inhibited, and
    F. controlling the depth of immersion of the member in the body of water during the relative movement between the oil slick and said member.

12. A method as defined in claim 11, wherein said output surface of said member is elliptically vibrated.

13. A method as defined in claim 11, wherein said output surface of said member is torsionally vibrated.

14. A method as defined in claim 11, wherein said output surface is vibrated in the range of at least 100,000 to 150,000 g.

15. A method of removing an oil slick layer of material from a water surface comprising the steps of:
  A. vibrating a member having an output surface above the threshold range of the oil in a frequency range of 1,000 to 100,000 cycles per second, so as to provide peak accelerations of at least 50,000 g,
  B. engaging said output surface of said vibrating member with the water surface to transmit said vibrations to the oil and the water at the interface thereof,
  C. homogenizing the oil and the water at the interface thereof so as to reduce the resulting mixtures viscosity whereby ready absorbtion into the body of water is obtained and the oil slick is removed,
  D. progressively moving said output surface relative to the oil slick layer, whereby the homogenized particles of oil are absorbed into the body of water and the oil slick is removed,
  E. disposing a reflecting surface beneath the oil slick,
  F. producing periodic perturbations in the liquid medium by applying to the liquid medium longitudinal vibrations of essentially plane wavefronts propagated along an axis substantially normal to said reflecting surface, and
  G. reflecting said vibrations back into said liquid medium along an axis substantially normal to said reflecting surface so that said reflecting vibrations are substantially in phase with said applied vibrations to increase the displacement amplitude of the liquid medium perturbations such that disjunctive forces are produced for reducing the viscosity of the oil slick for absorption into the water at least in part due to the forces generated in said perturbating medium.

16. A method as defined in claim 15, and further including the step of selecting the frequency of said longitudinal vibrations dependent upon the density of the oil.

17. A method as defined in claim 15, wherein said longitudinal vibrations applied to said liquid medium are of an intensity to produce essentially non-linear preturbations in the liquid medium thereby generating ponderomotive forces within said liquid medium for the dislocation and displacement of the oil particles into the water.

* * * * *